Sept. 23, 1941.　　　G. TRAUTVETTER　　　2,256,883

TRIM STRIP FOR VEHICLE BODIES

Filed May 18, 1940

INVENTOR
George Trautvetter

BY John P. Darby

ATTORNEY

Patented Sept. 23, 1941

2,256,883

UNITED STATES PATENT OFFICE 2,256,883

TRIM STRIP FOR VEHICLE BODIES

George Trautvetter, Philadelphia, Pa., assignor to Edward G. Budd Manufacturing Company, Philadelphia, Pa., a corporation of Pennsylvania Application May 18, 1940, Serial No. 335,954

8 Claims. (Cl. 105—401)

The invention relates to a sealing and trim strip for the margin of an opening, such as a window or door opening, in a vehicle body panel.

It is among the objects of the invention to provide such a strip which is inexpensive to manufacture and conveniently applied, and which when in place not only furnishes a finished appearance in the margin of the opening but also makes it possible to provide a waterproof seal in said margin. It is particularly applicable to side wall panels of vehicle bodies which have corrugated sheathing terminating in the margin of the opening, and a further object is to provide a ready means of closing and sealing the ends of the corrugations.

These objects are attained by providing a simple rolled section strip having a channel to receive the edge of the panel in the margin of the opening, one side wall of this channel being extended to form an attaching flange and the other side wall being of a thickness and provided with a face which may abut against and close the ends of the corrugations. To secure a watertight joint a suitable sealing compound is utilized between the strip and the parts in the margin of the opening with which it cooperates.

Other and further objects and advantages and the manner in which they are attained will become apparent from the following detailed description when read in connection with the drawing forming a part hereof.

Figure 1:
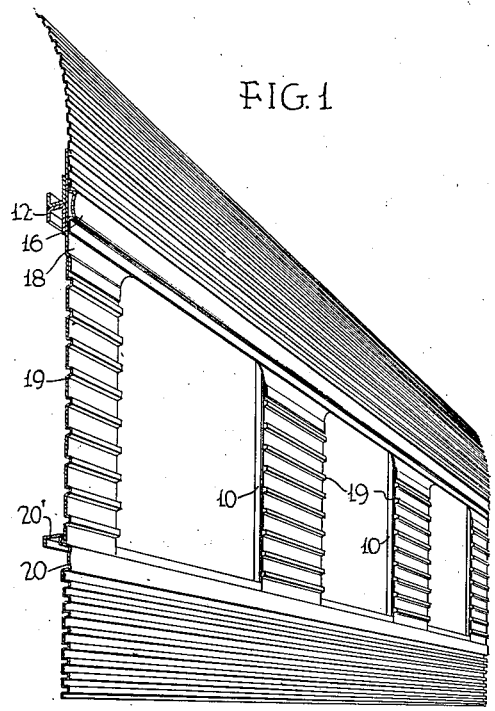
Fig. 1 shows in a perspective view a portion of the side wall panel of a rail car body to which the invention may be applied, but without showing the strip applied.
Figure 2:
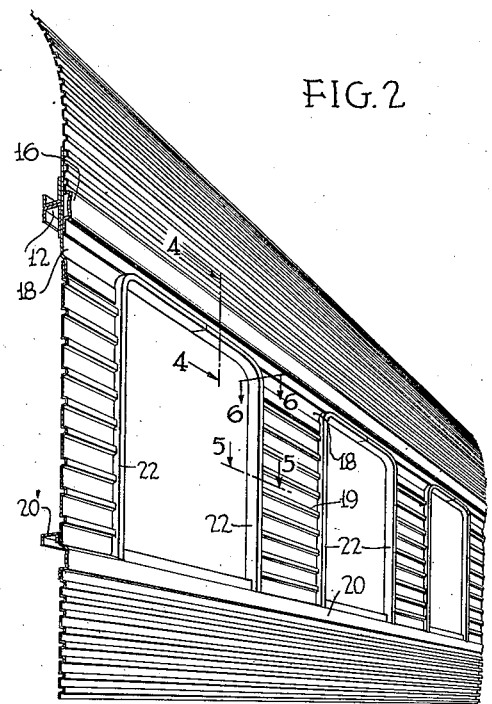
Fig. 2 is a similar view of said panel showing the invention applied thereto.
Figures 5, 6, 7:
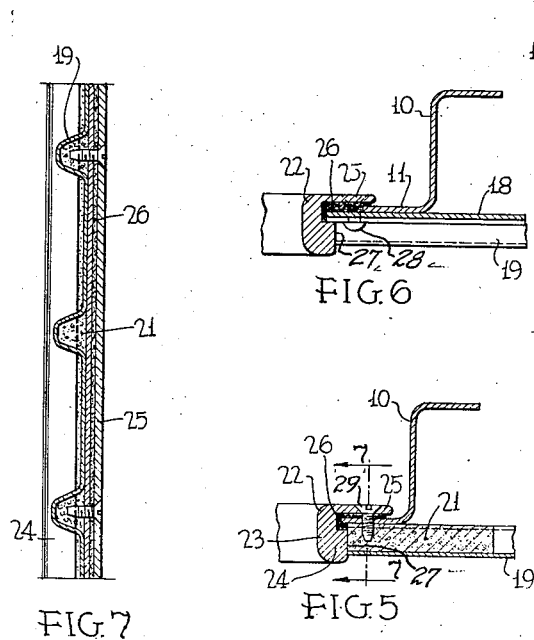
Figures 3, 4:
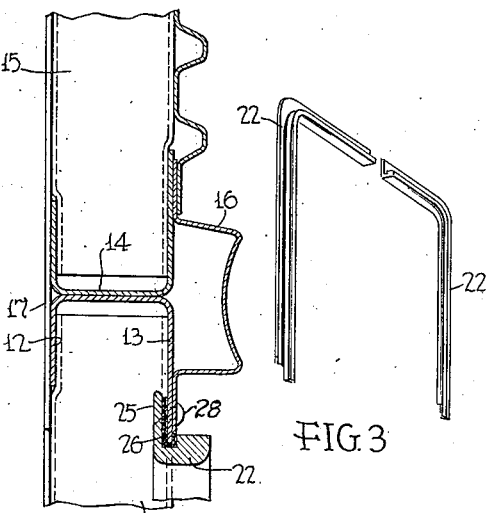
Fig. 3 is a detail perspective view of the two sections of a trim strip of an extent and shape to cover the side and top edges of a window opening.

Figs. 4, 5 and 6 show, in enlarged views, fragmentary detail sectional views taken, respectively, substantially on the lines 4—4, 5—5 and 6—6 of Fig. 2, and Fig. 7 is a detail section view taken on the line 7—7 of Fig. 5.

In the drawing, the invention is shown applied to the window openings of a rail car side wall panel. As shown in Figs. 1, 2, 4, 5 and 6, this panel may consist of vertical posts 10, one arranged in each margin of a window opening. In the particular embodiment shown, these posts are of Z cross section, having the web of the Z at right angles to the plane of the wall and the outer arm 11 of the Z extending toward the window opening. Thus, the side of the window (not shown) may be received in the angle formed by the web and outer arm of the Z. The posts are connected at the top by a through-running channel 12 telescoped over their upper ends and secured to the outer and inner arms of the Z-section posts, these outer and inner arms being offset the thickness of the metal of the channel so as to bring outer channel wall 13 into the same plane as the outer arms 11 of the posts.

A similar through-running channel 14 has its bottom wall abut and secured to the bottom wall of the channel 12, and is secured in a manner similar to the connection of the ends of the posts to the channel 12 to the ends of the roof carlines 15, which may also be of Z cross section. A through-running flanged channel moulding strip, as 16, is connected through its flanges to the outer side walls of the channels 12 and 14. Similarly, the inside walls of the channels and the adjacent post and carline may be connected by an overlapping gusset 17.

Between the window openings a large gusset 18, extending between the adjacent window openings in its lower portion and having its ends curved to conform to the curved upper corners of said openings, is interposed between the outer walls of the channels 12 and 14 and the moulding strip 16. Its lower portion extending below the moulding strip 16 forms the outer paneling between the window openings, overlaps the posts and is secured thereto, see Fig. 6. The lower portion is outwardly offset, see Fig. 2, to overlap and be secured to the outer side of the top margin of a longitudinally corrugated panel 19 extending between the adjacent window openings and terminating at the bottom in overlapping relation with a through-running flanged channel moulding strip 20 similar to the moulding strip 16. This moulding strip is secured to the posts and to the bottom margin of the panel 19, and additionally to a channel section sill member 20' forming the bottom of the window opening and extending between the posts.

In the lateral margins of the window opening, the corrugated panel terminates somewhat short of the edge of the outer arm 11 of the posts, see Fig. 6, and is secured thereto at the bottoms of the corrugations. Prior to the attachment, outwardly projecting portions of the corrugations are filled for some distance inwardly from their ends, as shown in Fig. 5, with a filler 21 which may be a cork strip treated first with a suitable sealing compound to close the corrugations watertight.

The foregoing description covers the foundation structures with which the strip of the invention is associated to provide a neat and waterproof cover for the raw edges and corrugations in the margins of the window openings.

This strip, designated generally by numeral 22, is preferably applied around the sides and top of the window opening to provide a uniform finish at sides and top, and is conveniently formed of an extruded section of some readily bendable material, such as aluminum, cut in lengths and bent so as to provide two parts for each window, each to cover one-half of the top margin and extend around the corner and to the bottom of the window opening, as shown in Fig. 3.

The strip is preferably of a section shown clearly in Figs. 4, 5 and 6, having a generally channel cross section. The bottom of the channel 23 and its outer side wall 24 are relatively thick and the inner side wall 25 relatively thin and extended to a substantially greater depth than the outer side wall to provide a wide attaching portion for the strip.

In the application of the strip, the channel is filled with a suitable sealing compound 26, and then the two parts 22 of the strip, with their top edges abutting, are applied to the top and sides of the frame formed, at the top, by the double thickness formed by channel wall 13 and the attaching marginal flange of the moulding strip 16, at the corners, by the gussets 18 and the overlapping flange 11 of posts 10, and, at the sides, by the flange 11 of the posts and the corrugated panels 19, all of which are in the same plane. In this application, the flat face 27 of the thick outer side wall 24 is pressed against the ends of the filled corrugations closing them, and the attaching portion 25 is then secured to the overlapping double margins of the frame formed as above described, and secured thereto as by rivets 28, Figs. 4 and 6, or by screws 29, Fig. 5. The sealing compound 26 provides, with the filling 21 of the corrugations, a watertight seal at the joint, and the appearance of the opening is enhanced by the curved contours given to the portion of the trim strip which is exposed to view. As shown in Fig. 7, the corrugations provide space to receive the ends of the securing screws 29.

What is claimed is:

1. In a vehicle body side wall having an opening therein, a frame member defining the margin of said opening and having a flange projecting toward said opening, a corrugated panel overlapping said flange, secured thereto and terminating somewhat short of the margin of the flange, and a trim strip covering the margins of said flange and panel and having a channel receiving the margin of the flange, the inner side wall of said channel extending longitudinally of, and overlapping, the inside face of said flange and forming a securing portion for the strip and the outer trim strip wall being formed with a transversely widened flat face seated against and closing the ends of the corrugations of said panel.

2. In a vehicle body side wall having an opening therein, a frame member defining the margin of said opening and having a flange projecting toward said opening, a corrugated panel overlapping said flange, secured thereto and terminating somewhat short of the margin of the flange, a trim strip covering the margins of said flange and panel and having a channel receiving the margin of the flange, the inner side wall of said channel extending longitudinally of, and overlapping, the inside face of said flange and forming a securing portion for the strip, and the outer trim strip wall being formed with a transversely widened flat face seated against and closing the ends of the corrugations of said panel, and a filler in the inside troughs of the corrugations closing said ends.

3. In a vehicle body side wall having an opening therein and including a corrugated panel having a margin across the corrugations along a portion of the outline of said opening, and a trim strip of angle section secured to the wall having a side backing said corrugated margin and a side closing the ends of the corrugations thereof.

4. In a vehicle body side wall having an opening therein and including a corrugated panel having a margin across the corrugations along a portion of the outline of said opening, a trim strip of angle section having a side backing said corrugated margin and a side closing the ends of the corrugations thereof, and a frame member including a flange having a portion between said backing side and said corrugated margin.

5. In a vehicle body side wall having an opening therein and including a corrugated panel having a margin across the corrugations along a portion of the outline of said opening, a trim strip of angle section having a side backing said corrugated margin, a side closing the ends of the corrugations thereof, and a channel portion between said backing and closing sides, and a frame member including a flange having a portion backing said panel and a portion extending beyond the panel into said channel.

6. In a vehicle body side wall having an opening therein and including a corrugated panel having a margin across the corrugations along a portion of the outline of said opening, a trim strip of angle section having a side backing said corrugated margin, a side closing the ends of the corrugations thereof, and a channel portion between said backing and closing sides, a frame member including a flange having a portion backing said panel and a portion extending beyond the panel into said channel, and sealing material in the channel about the sides and edge of said extending flange portion.

7. In a vehicle body side wall having an opening therein and including a corrugated panel having a margin across the corrugations along a portion of the outline of said opening, a trim strip of angle section secured to the panel having a side backing said corrugated margin and a side closing the ends of the corrugations thereof, and a filler in the inside troughs of said corrugations closing the same at said ends.

8. In a vehicle body side wall having an opening therein and including a corrugated panel having a margin across the corrugations along a portion of the outline of said opening, a trim strip of angle section having a side backing said corrugated margin and a side closing the ends of the corrugations thereof, and screw means or the like extending through said backing side to a position intermediate the inner and outer ridges of said corrugated margin for securing the trim strip to the panel.

GEORGE TRAUTVETTER.